(12) United States Patent
Barnett

(10) Patent No.: US 6,343,276 B1
(45) Date of Patent: Jan. 29, 2002

(54) SHOE SIZE SCANNER SYSTEM

(76) Inventor: Sharon B. Barnett, 703 Cornwall St., Silver Spring, MD (US) 20901

( * ) Notice: Subject to any disclaimer, the term of this patent is extended or adjusted under 35 U.S.C. 154(b) by 0 days.

(21) Appl. No.: 09/484,213

(22) Filed: Jan. 18, 2000

(51) Int. Cl.⁷ .............................................. G06F 17/60
(52) U.S. Cl. ...................................................... 705/28
(58) Field of Search ..................................... 705/22, 28

(56) References Cited

U.S. PATENT DOCUMENTS

| | | | |
|---|---|---|---|
| 5,023,438 A | 6/1991 | Wakatsuki et al. | |
| 5,361,871 A | 11/1994 | Gupta et al. | |
| 5,878,401 A | 3/1999 | Joseph | 705/22 |
| 5,890,136 A | 3/1999 | Kipp | |
| 5,940,808 A | 8/1999 | Joseph | 705/22 |

FOREIGN PATENT DOCUMENTS

WO  WO 97/26610  7/1997

OTHER PUBLICATIONS

"From Symbol Technologies 10–K for Dec. 31, 1997 Bar Code Scanning Products" http://www.secinfo.com/d8Fqv.7d.htm.*

George Kapsambelis, "The Changing Face of Portable Data Collection", Automatic ID News, Aug. 1999, pp. 16–17.*

PCK 9100 System, 2001.*

PDT 3100 Series, 2000.*

* cited by examiner

*Primary Examiner*—Robert P. Olszewski
*Assistant Examiner*—Bryan Jaketic
(74) *Attorney, Agent, or Firm*—Richard C. Litman

(57) ABSTRACT

The shoe size scanner system is an automated system for use in retail stores, and particularly in shoe stores. The scanner system has a base unit which interfaces with the store's computerized inventory system, and a plurality of remote units which interface with the base unit. The remote units include at least the input device of a bar code scanner, and may be either fixed mount or portable, handheld scanning units. The fixed mount units are positioned in fixed locations, such as display shelves or tables and may be used by either store clerks or customers. The handheld units are intended for use by sales clerks, and may be supported by a neck strap, arm band, or belt clip. According to the shoe size scanner system, each shoe on display in the store has a bar code affixed thereto which encodes an identifier number corresponding to the model of the shoe. Either a sales clerk or a customer may scan the bar code with the remote unit, which communicates with the base unit and returns identification of the shoe model. The sales clerk or customer may then select one of three function keys so that the remote unit will display, for that particular model, either (1) a list of all shoe sizes in stock; (2) a response indicating whether the shoe is in stock in a specified length and width; or (3) a list of all shoe widths in stock in a specified length. Price information for each shoe listed in the response is provided.

18 Claims, 12 Drawing Sheets

CUSTOMER REPORT: 001

CUSTOMER NAME: JOHN DOE  /305

ITEM DESCRIPTION: ABC WINGTIP SHOE STYLE B1                310

IN STOCK AVAILABILITY:  LENGTH    WIDTH    PRICE
                        7.5       D        65.00
                        8         E        65.00
                        9         EE       65.00

ITEM DESCRIPTION: DEF PENNY LOAFER STYLE A3                315

IN STOCK AVAILABILITY: LENGTH 8
                       WIDTH E
                       IN STOCK: YES
                       PRICE: $59.95

ITEM DESCRIPTION: XYZ ATHLETIC SHOE STYLE D4               320

LENGTH 8
                  IN STOCK: YES
                  WIDTH: D  $49.50
                         E  $49.50
                         EE $49.50

END OF REPORT CUSTOMER JOHN DOE

SHOE SIZE SCANNER SYSTEM

BACKGROUND OF THE INVENTION

1. Field of the Invention

The present invention relates to computer based inventory and sales systems, and particularly to a shoe size scanner system which permits retail sales clerks and customers to ascertain whether shoe display models are currently in stock in a particular shoe size.

2. Description of Related Art

In the field of retail sales, it is necessary to make maximum use of automated systems for tracking inventory in order to free store clerk time for assisting customers. Shoe stores, in particular, lose many man hours in searching stock rooms to ascertain whether a shoe on display is currently in stock in a given size and color. Many potential sales are lost because potential customers cannot determine whether a model on display is in stock in their size without the assistance of a sales clerk. If the store happens to be busy, the customer may have to wait twenty to thirty minutes for a sales clerk to become available, and another ten to twenty minutes while the clerk searches the stock room to look for the proper size shoe, only to be told that the shoe is not available in the desired size.

It would be desirable, therefore, to have an automated system which may be used by the clerk to determine whether an item on display is in stock in a particular size without the necessity for going to the stockroom and manually searching the shelves. It would further be desirable to have an automated system which may be used by the customer without the assistance of a sales clerk to determine whether an item on display is in stock in a particular size. Several patents describe automated systems to facilitate inventory and sales in the retail setting.

U.S. Pat. No. 5,878,401, issued Mar. 2, 1999 to J. Joseph describes an inventory system for a retail shoe store which displays an alternate shoe when the requested shoe is out of stock. When a sales clerk enters a stock keeping unit (SKU) for an item a sales computer accesses a product database to determine the size ranges for that SKU number, then a size conversion database to determine the size corresponding to the actual shoe size desired, then a size database to determine the number of units received an sold in that size. If the shoe is not in stock, an alternative shoe is selected and a JPEG image of the alternative shoe is displayed. The only mention of bar codes in the Joseph patent is for tracking requests from the salesperson to the stockroom. The Joseph patent does not describe a method for customer access to the automated system.

U.S. Pat. No. 5,940,808, also issued to J. Joseph on Aug. 17, 1999, discloses a method of tracking inventory versus display items in a shoe store. Each shoe on display is associated with a tag displaying a bar code and a price. A handheld bar code scanner is used to scan the bar code of all items displayed in the store. The information in the scanner memory is downloaded to a central computer which looks to the ID Tag Number associated with the bar code to determine the SKU and examines the databases described in the '401 patent to determine current inventory stocks. If the display is not in stock or is only available in limited numbers which should be on display, a report is generated. A report is also generated for items in stock but not on display.

U.S. Pat. No. 5,361,871, issued Nov. 8, 1994 to Gupta, et al., teaches a system which provides shoppers with remote portable units for reading Universal Price Code (UPC) bar codes, particularly for use in supermarkets where the remote units may be attached to shopping carts. The system includes a host computer, an intermediate computer and a plurality of remote units. The host computer periodically updates price information on the intermediate computer and also controls prices at checkout counters. The remote units include a microprocessor with RAM which receives updated price information from the intermediate computer. The shopper may scan the UPC on various items to determine the price, and may total the items scanned to determine what the total bill is. The Gupta device does not provide size or inventory information for items on display but stored in a stockroom.

U.S. Pat. No. 5,023,438, issued Jun. 11, 1991 to Wakatsuki, et al., shows a portable pen-scanner for reading bar codes when doing inventory work. The scanner includes a remote transmitter/receiver for wireless transmission of inventory order information from the scanner to a data processing device. U.S Pat. No. 5,890,136, issued Mar. 30, 1999 to L. Kipp, describes a mass retail system for automated sales which includes an inventory database which is updated as sales are made. International Patent No. WO 97/26610, published Jul. 24, 1997, discloses a handheld computer unit by car salesmen which provides access to dealership inventory and the inventory of other dealerships.

None of the above inventions and patents, taken either singularly or in combination, is seen to describe the instant invention as claimed. Thus a shoe size scanner system solving the aforementioned problems is desired.

SUMMARY OF THE INVENTION

The shoe size scanner system is an automated system for use in retail stores, and particularly in shoe stores. The scanner system has a base unit which interfaces with the store's computerized inventory system, and a plurality of remote units which interface with the base unit. The remote units include at least the input device of a bar code scanner, and may be either fixed mount or portable, handheld scanning units. The fixed mount units are positioned in fixed locations, such as display shelves or tables and may be used by either store clerks or customers. The handheld units are intended for use by sales clerks, and may be supported by a neck strap, arm band, or belt clip. According to the shoe size scanner system, each shoe on display in the store has a bar code affixed thereto which encodes an identifier number corresponding to the model of the shoe. Either a sales clerk or a customer may scan the bar code with a remote unit, which communicates with the base unit and returns identification of the shoe model. The sales clerk or customer may then select one of three function keys so that the remote unit will display, for that particular model, either (1) a list of all shoe sizes in stock; (2) a response indicating whether the shoe is in stock in a specified length and width; or (3) a list of all shoe widths in stock in a specified length. Price information for each shoe listed in the response is provided.

Accordingly, it is a principal object of the invention to increase sales clerk efficiency by providing an automated shoe size scanning system for ascertaining whether a shoe on display is available in a particular shoe size.

It is another object of the invention to improve customer convenience through an automated shoe size scanner system enabling a customer to ascertain whether a shoe on display is available in a desired size without the intervention of a sales clerk.

It is a further object of the invention to enable sales clerks and customers to determine up-to-date in stock inventory of items on display in a retail store without the necessity of a manual search of the stock room.

Still another object of the invention is to increase efficiency in retail sales by providing sales clerks and customers with means for remote, limited access to the store's computerized inventory system.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 9 is a sample report which may be generated by the shoe size scanner system according to the present invention.

Similar reference characters denote corresponding features consistently throughout the attached drawings.

DETAILED DESCRIPTION OF THE PREFERRED EMBODIMENTS

Figure 1:
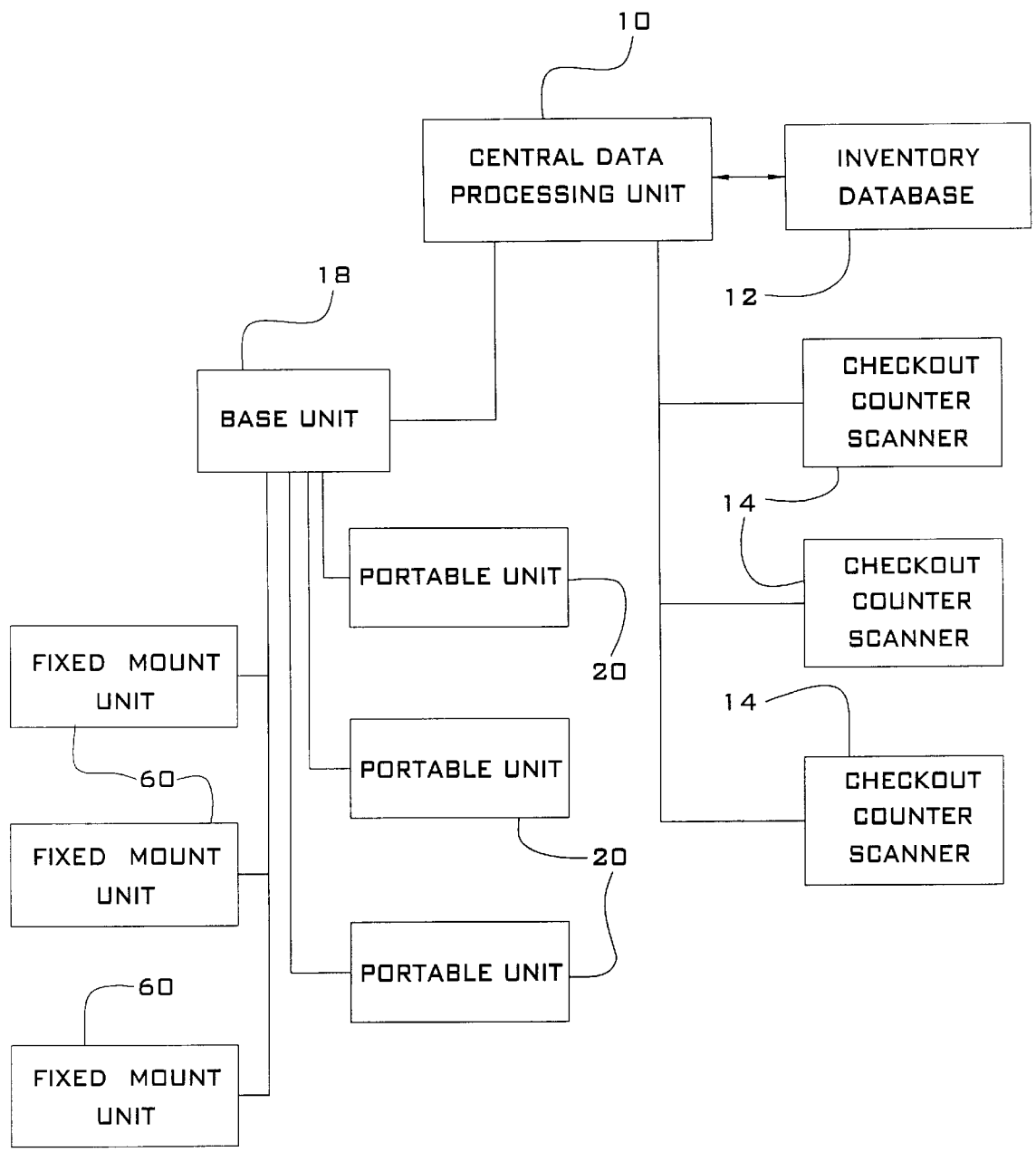
FIG. 1 is a block diagram of a shoe size scanner system according to the present invention.

The present invention is a shoe size scanner system for providing customers and sales clerks with quick response information from a computerized inventory system about whether a shoe model on display is in stock in a particular shoe size. block diagram showing the interface of the shoe size scanner system with the store's computerized inventory system is shown in FIG. 1. The store maintains its inventory in a Central Data Processing Unit (CDPU) 10, which may be a mainframe computer, minicomputer microcomputer, or personal computer. Preferably, the inventory is maintained with a relational database, which may be Microsoft's Access® or FoxPro™, Borland's Paradox, Oracle, or any other database software conventional in the industry which is capable of providing data concerning particular inventory items in response to a query specifying parameters of the items, such as model number size, width, etc.

The inventory database 12 will typically contain one or more tables which relate a unique product identification number to such data as a literal string describing the model, the shoe size, the shoe width, the number of units received, the number of units sold, and the number of units in stock (the latter may be calculated from the number of units received and the number of units sold) and unit price. The exact structure of the database 12, including the number of tables and their organization, interfaced with the shoe size scanner system may vary, provided that the database 12 is capable of generating a table in response to a query providing certain parameters identifying the requested information. The query may be presented by conventional programming techniques, such as Structured Query Language (SQL). Depending upon the particular query, as described infra, the parameters presented may include, e.g., product identification number, shoe length, shoe size, etc. Such inventory databases are well known in the art and will not be described further. An example of such an inventory system is described in U.S. Pat. No. 5,878,401, the disclosure of which is incorporated herein.

It is preferable that the inventory database 12 be updated in real time. Thus as sales are made, a plurality of checkout counter scanners 14 automatically communicate with the CDPU 10 in order to update the number of units sold and in stock as the sales are made.

Figure 2:
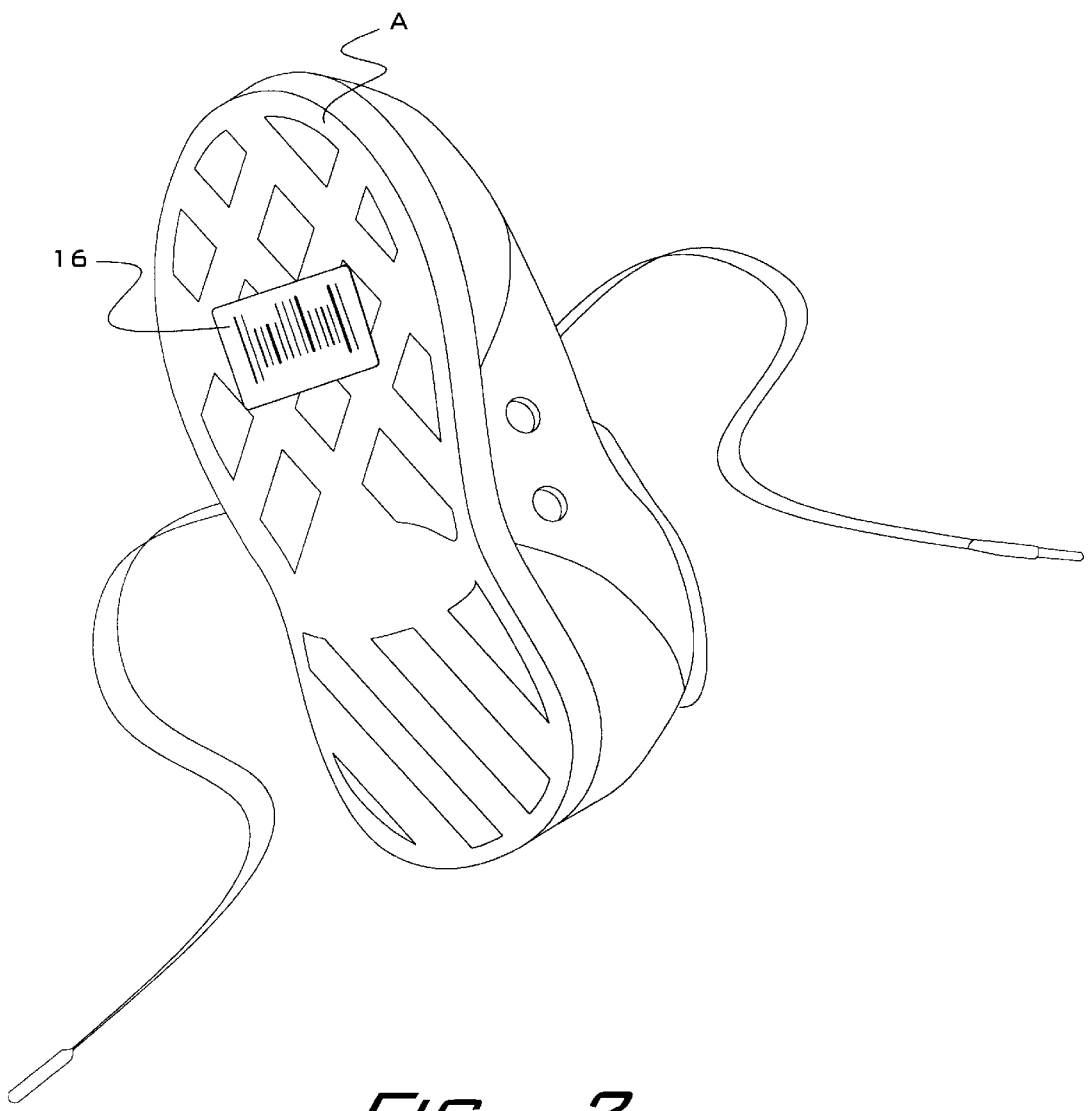
FIG. 2 is a perspective view of a shoe having a bar code label thereon.

The product identification number should be a unique number identifying the shoe on display, at least by manufacturer and model or style. According to the shoe size scanner system of the present invention, a bar code containing a symbolic representation of the product identification number is affixed to each shoe on display, as represented in FIG. 2 by a bar code label 16 adhesively attached to the sole of a shoe A. The bar code may be affixed to the shoe by the manufacturer, a wholesaler, or the retail store. The product identification number may be a Universal Price Code (UPC), a stock keeping unit (SKU), or a customized identification number used in the retail store's computerized inventory system. A conventional Version "A" UPC bar code symbol, e.g., is a twelve digit code in which the first six digits represent the manufacturer of the item, the next five digits represent the unique product, and the last digit is a check character. A UPC Version "E" bar code presents substantially the same number in fewer digits by suppressing redundant zeroes. A customized identification number may be used by the retailer to further uniquely identify the product, which may be printed on a bar code label and applied to the shoe on display by the retailer.

Figure 3:
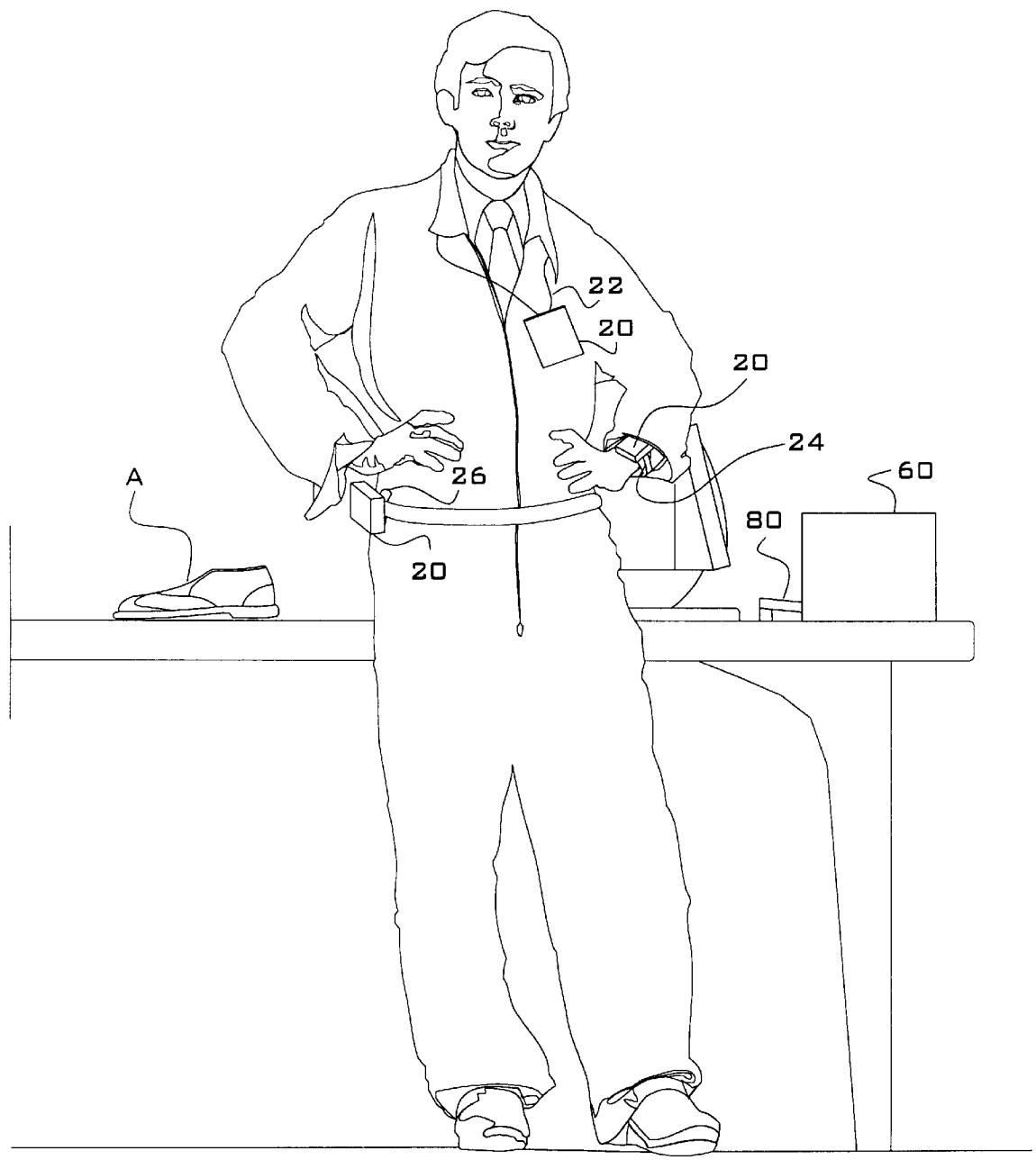
FIG. 3 is an environmental, perspective view of remote units of the shoe size scanner system according to the present invention.

The shoe size scanner system includes a base unit 18 in communication with the CDPU 10, and at least one remote unit in communication with the base unit 18. Preferably, the remote units include both portable units 20 and fixed mount units 60. The portable units 20 are intended for use by sales clerks only. The portable units may be worn or carried by the sales clerk, for example, on a strap 22 or chain worn around the neck, on a band 24 on the arm or wrist, or on a belt clip 26, as shown diagrammatically in FIG. 3. The fixed mount units 60 are intended for use by either customers or sales clerks. The fixed mount units 60 may be located on display tables, counters, or shelves, or on walls or shelves adjacent to the shoe display. The fixed mount units 60 may optionally be connected to a personal computer 100 equipped with a printer for a purpose described below.

Figure 4:
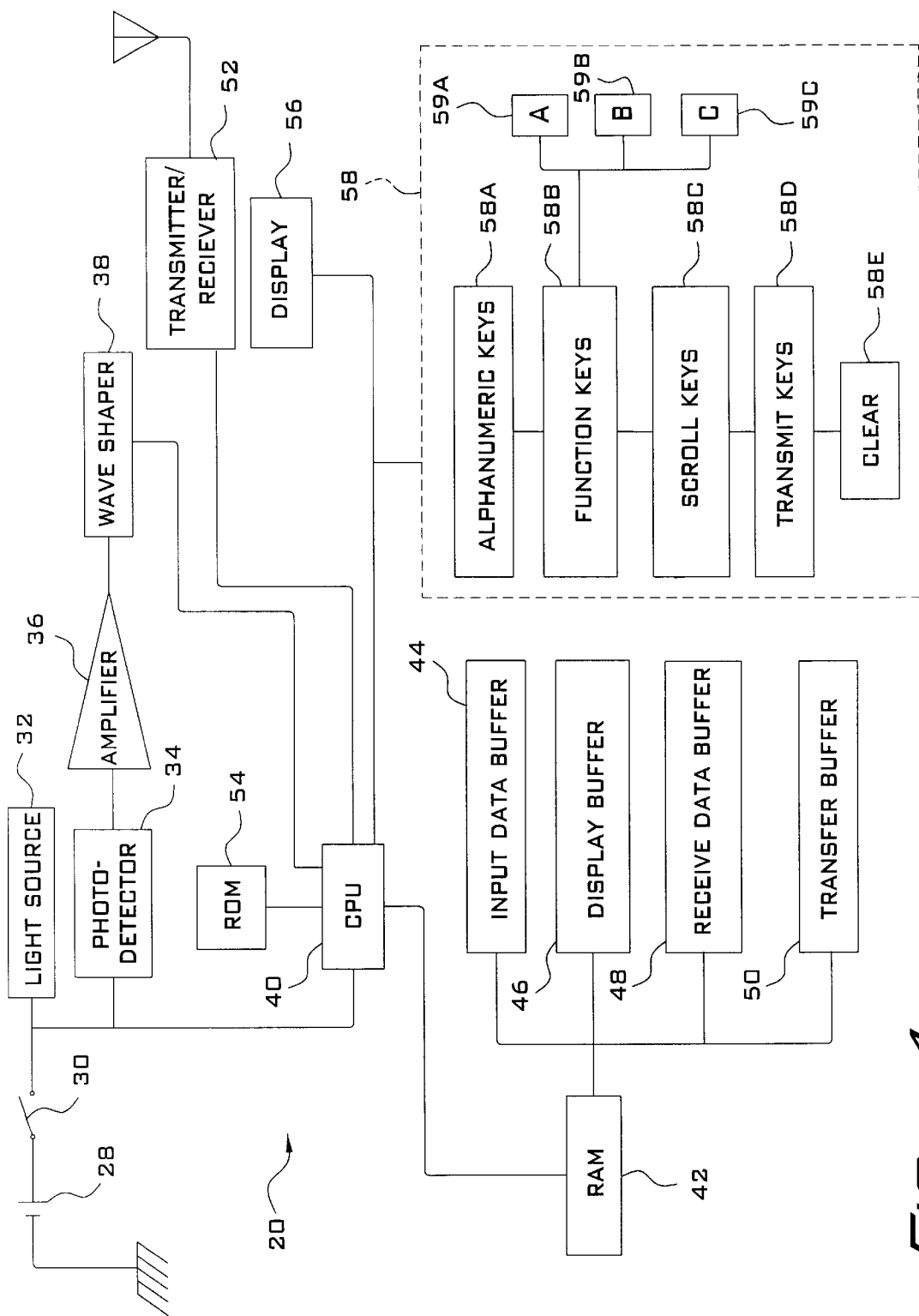
FIG. 4 is a block diagram of a portable remote unit of the shoe size scanner system according to the present invention.

A block diagram of a portable unit 20 is shown in FIG. 4. Portable bar code scanners are well known in the art. Portable scanners may have a decoding unit integral with the optical scanning unit, or the decoder may be in a separate physical unit, in which case the optical scanner is referred to as an input device. If the decoder is in a separate unit, the scanned data may be downloaded to the decoder by an RS-232 connection after all the data is scanned, or the scanned data may be transferred by radio wave communication to an online decoder for real time communication with the base unit 18. The portable units 20 of the present invention are preferably of the latter variety.

The portable units have a battery 28 power supply which may be controlled by a power on/off switch 30. The unit 20 has a light source 32 which transmits a fixed laser beam which is moved across the bar code symbol 16 by physically moving the entire unit. The reflected light is received by a photodetector 34 and the resulting electrical signal is processed by an amplifier 36 and waveshaper 38 circuitry to convert the analog voltage to a form which may be converted to a binary code of "0" and "1". The scanned waveform data may be stored by the Central Processing Unit (CPU) 40 in an area of Random Access Memory (RAM) 42 reserved as an input data buffer 44, and transmitted by an integral transmitter/receiver, or transceiver, 52 to the base unit 18. The RAM 42 may include three other reserved buffer areas, including a display buffer 46, a receive data buffer 48, and a transfer buffer 50, for purposes described below.

The portable unit 20 also includes an area of Read Only Memory (ROM) 54, a display (preferably LCD) 56, and a keypad 58. The keypad 58 has a plurality of keys, including a plurality of alphanumeric keys 58A, a plurality of function keys 58B including functions "A" 59A, "BB" 59B, and "C" 59C, scroll keys 58C for scrolling the display vertically and horizontally, a transmit key 58D, and a clear key 58E.

Figure 5:
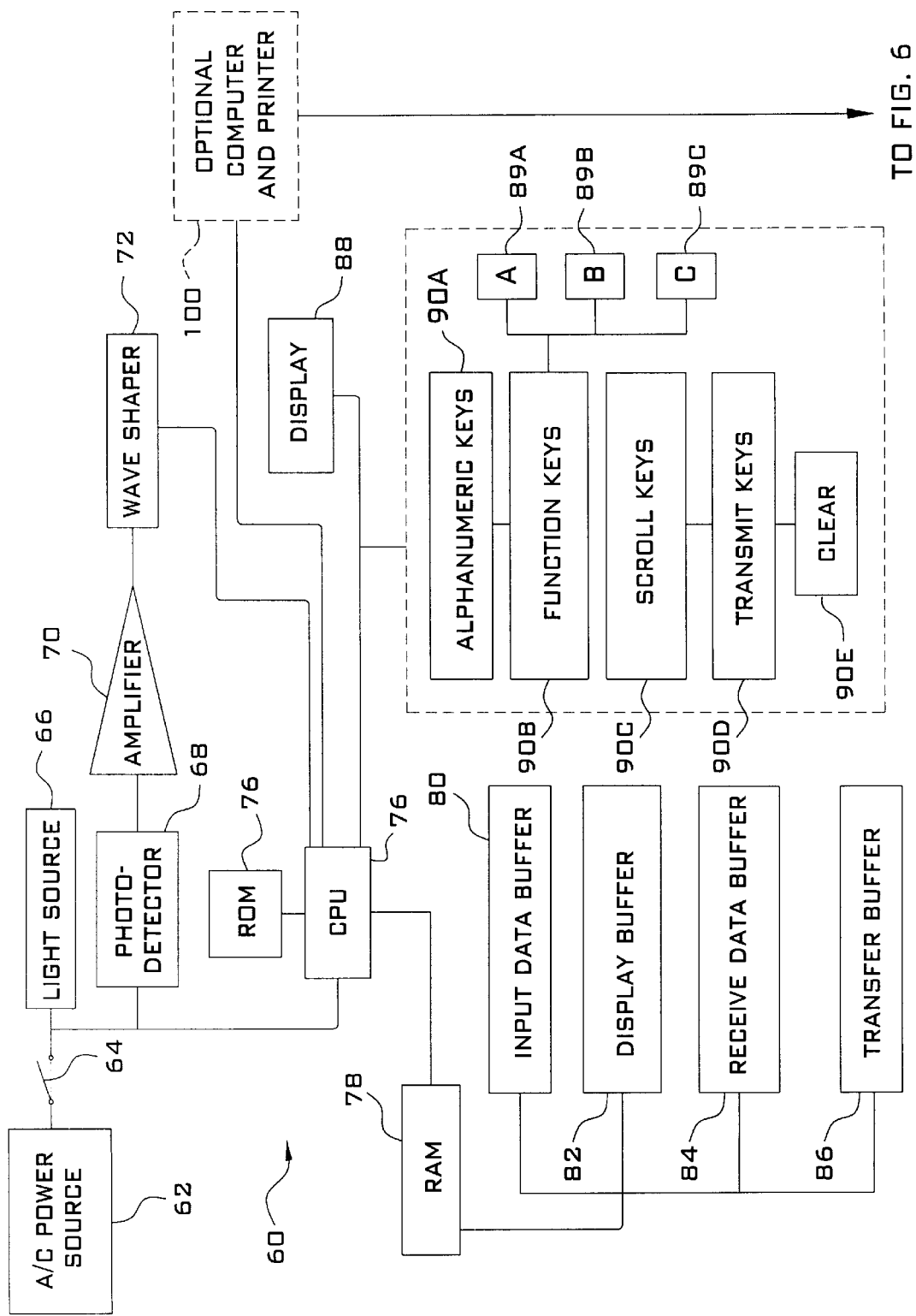
FIG. 5 is a block diagram of a fixed mount remote unit of the shoe size scanner system according to the present invention.

A block diagram of a fixed mount unit 60 is shown in FIG. 5. The fixed mount unit has a power source 62 and a power on/off switch 64. Although shown in FIG. 5 as an alternating current power source, such as a wall outlet, it will be understood that that the power source 62 may be battery power, if desired. The fixed mount unit 60 also includes a light source 66, photodetector 68, amplifier 70, and waveshaper circuitry 72.

However, in the preferred embodiment, the structure of the input device of the fixed mount unit 60 is different than the structure of the input device of the portable unit 20. The portable unit 20 is for use by sales clerks, and hence may be of the light pen or wand variety attached to or integral with the radio transmitter/receiver unit. The portable unit 20 is used by moving the fixed beam light source across the bars and spaces of the bar code label 16. As the sales clerks uses such units daily, it is reasonable to assume that the sales clerks have or can acquire sufficient skill to position the scanner properly and move it across the bar code at a proper speed to minimize scanning errors.

However, the fixed mount units 60 are also intended for use by customers, who may not possess such skills. It is therefore preferred that the fixed mount units 60 have a light source which is known in the art as a moving beam so that the label 16 remains fixed position while the light source, inside the fixed mount unit 60 housing, moves across the bar code label 16 at a predetermined speed. Alternatively, the fixed mount unit 60 may be of the type known as a charge-coupled device (CCD) scanner, in which the light source 66 provides flood illumination across the entire bar code symbol, while the photodetector 68 is in the form of an array of photodiodes which electronically scan the symbol in a line going across the symbol. Yet another alternative is that the fixed mount unit 60 may comprise a so-called vision scanner, in which the bar code is illuminated and a high resolution electronic image of the symbol is taken and processed by software algorithms in a digital signal processor (DSP) chip. Each of the three alternatives are conventionally known, require little skill to operate, and achieve low scanning error rates.

The fixed mount units 60 also include a CPU 74, ROM 76, RAM 78, and buffer areas in RAM 78 including an input data buffer 80, display buffer 82, receive data buffer 84, and transfer buffer 86. The fixed mount units 60 have a display 88 and a keypad 90. The keypad 90 is similar to the keypad 58 of the portable unit 20, and includes a plurality of alphanumeric keys 90A, a plurality of function keys 90B including functions "A" 89A, "B" 89B, and "C" 89C, scroll keys 90C for scrolling the display vertically and horizontally, a transmit key 90D, and a clear key 90E.

Although the fixed mount units may communicate with the base unit 18 by an integral transmitter/receiver, in the preferred embodiment the fixed mount units 60 communicate with the base unit 18 by a hardwire connection through RS-232 terminals and data communication cables or otherwise, as is conventionally known in the art.

Figure 6:
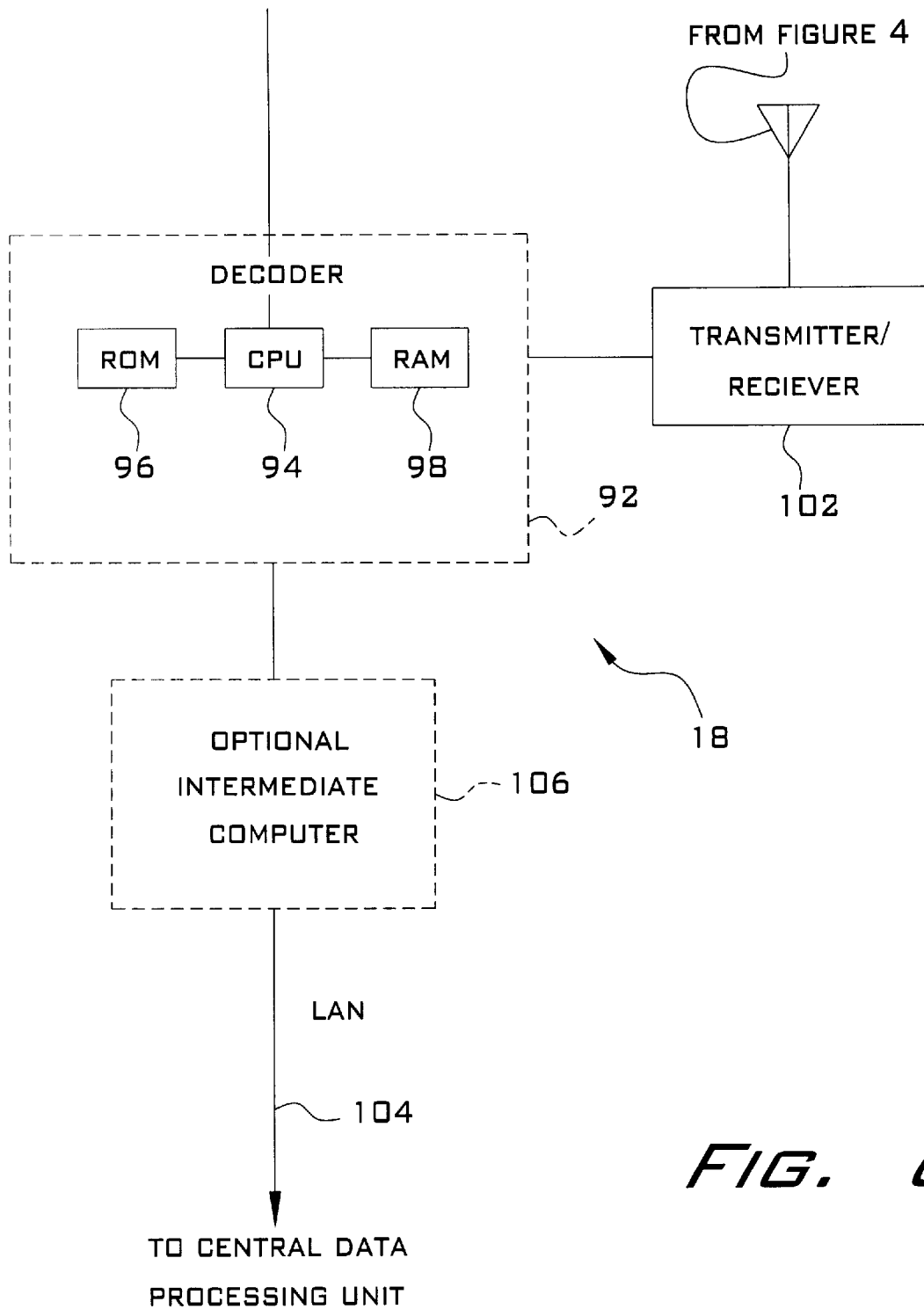
FIG. 6 is a block diagram of a base unit of the shoe size scanner system according to the present invention.

A block diagram of a base unit 18 is shown in FIG. 6. The base unit 18 is built around a decoder 92. The decoder 92 runs software in ROM 96 or RAM 98 on a microprocessor or CPU 94 which converts the raw output from the portable 20 and fixed mount 60 units into a numerical representation of the product identification number. Among other functions, the decoder 92 measures the width of each bar and space in the symbol (or the distance or time between a bar or space and the next succeeding bar or space), quantizes the element widths, decodes the symbols by comparing the quantized widths to a character set table, checks the scanning speed and check character for errors, and other conventional decoder functions.

The decoder 92 receives scanned data from the fixed mount units by hardwire. The base unit 18 includes a transmitter/receiver, or transceiver, 102 for communication to and from the portable units 20. The transceiver units 52 and 102 may provide low power digital transmission on narrow band frequencies in the 900 MHz range, or using spread spectrum techniques in the 2.4 GHz or 5.7 GHz band. Bar code scanner input devices and decoders equipped with such transmitter/receivers are conventionally available. Each transmission to or from a particular portable unit 20 or a particular fixed mount unit 60 may be preceded by a unique device identifier code so that the units 20, 60 and 18 may be programmed to ignore extraneous or interfere transmitters on the same frequency, so that the base unit 18 may address responses particularly to the requesting unit, and so that the remote units 20 and 60 need only display responses directed to their particular enquiry.

The base unit 18 communicates with the CDPU 10 either through a hardwire connection, by modem, or if the base unit includes an optional personal computer and printer 106, by a local area network (LAN) 104 connection. The CDPU 10 may be physically located in the retail store. In the case of retail chain stores, however, the CDPU 10 may be physically located at another geographical location, in which case the base unit will preferably include the optional intermediate computer 106 with a local copy of the inventory database 12, and communications may be by modem or by an Internet communication.

Figure 7A:
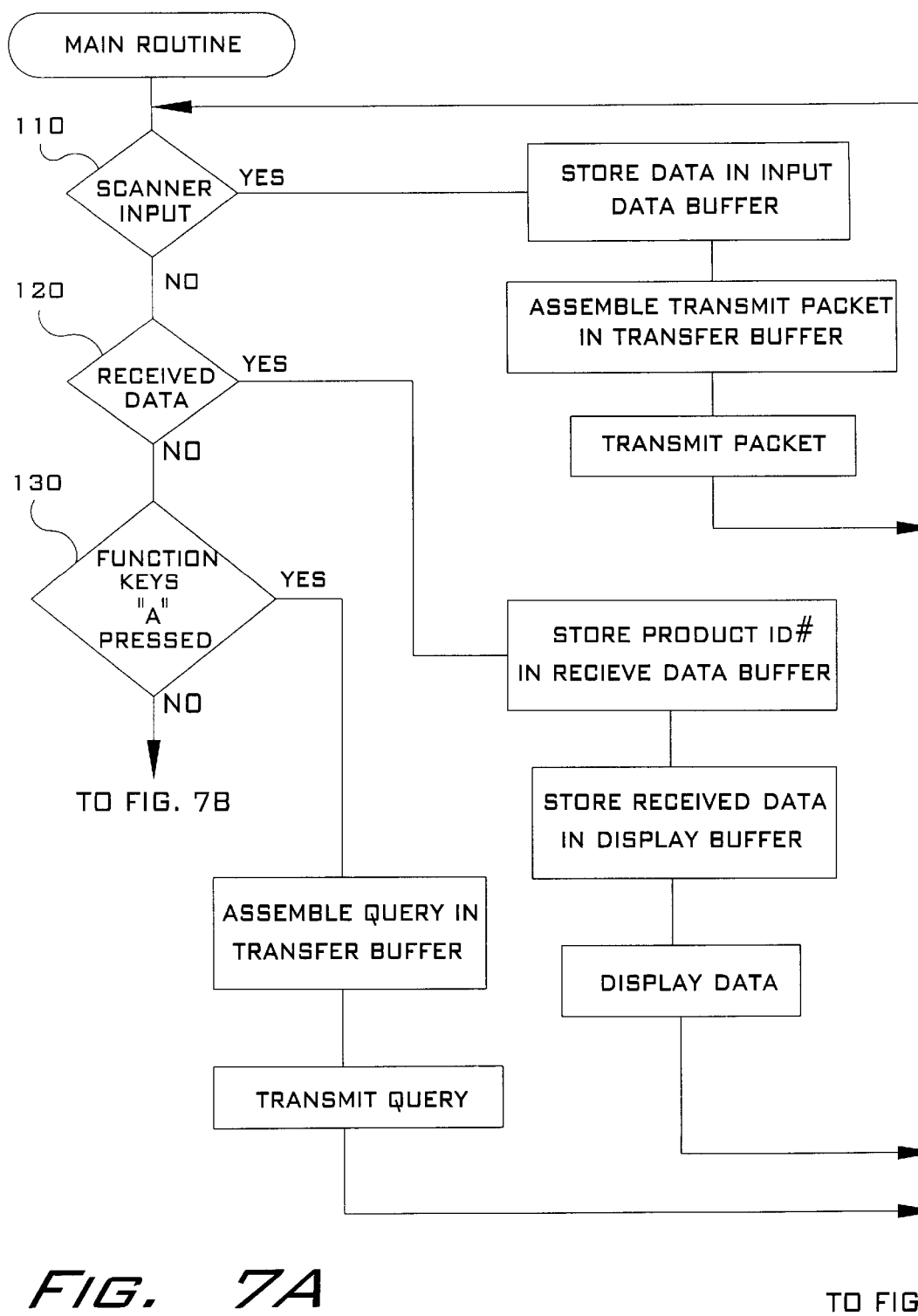
FIGS. 7A, 7B, and 7C are a flow chart of the software system incorporated into the remote units of the shoe size scanner system according to the present invention.
Figure 7B:
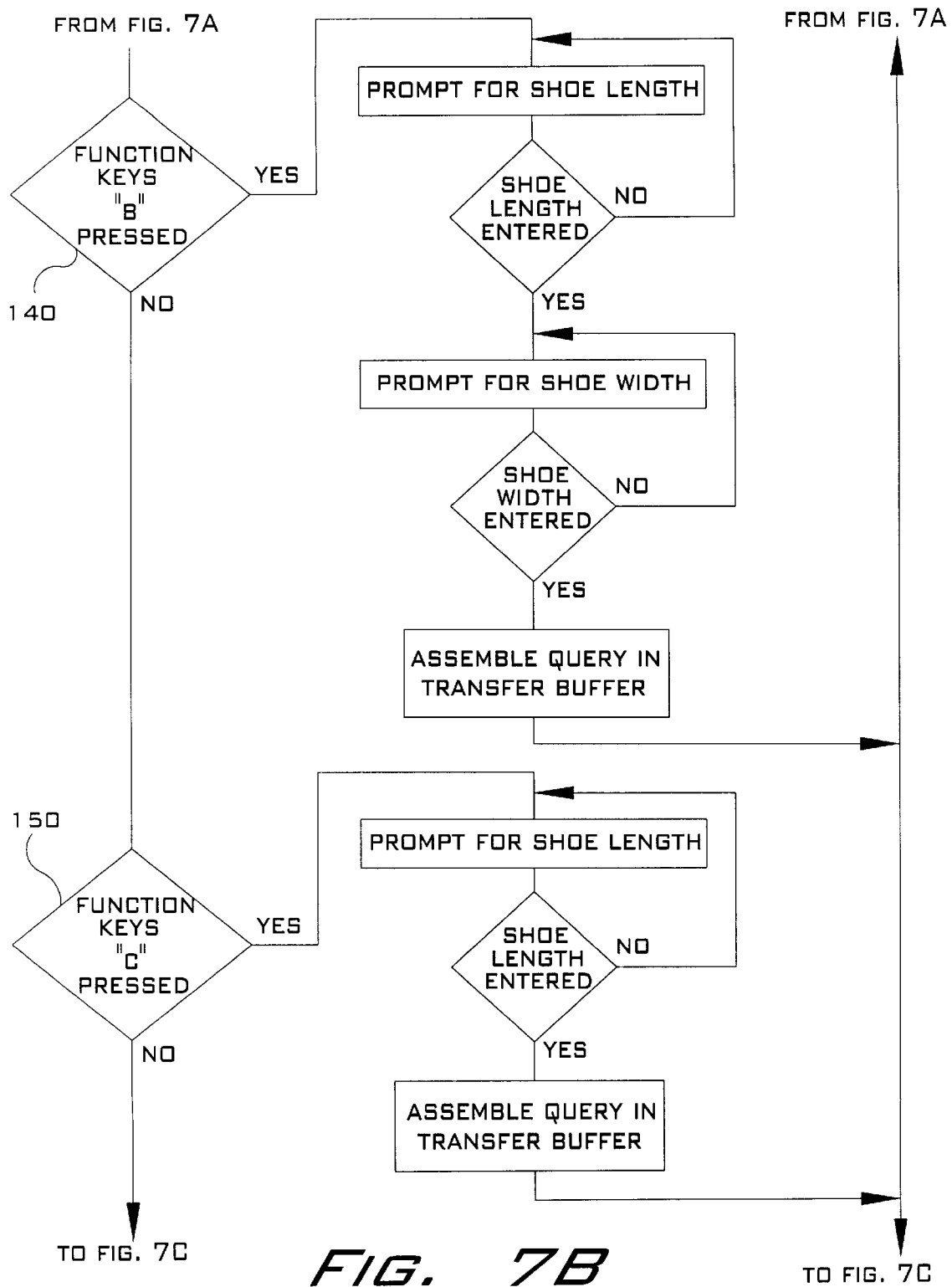
Figure 7C:
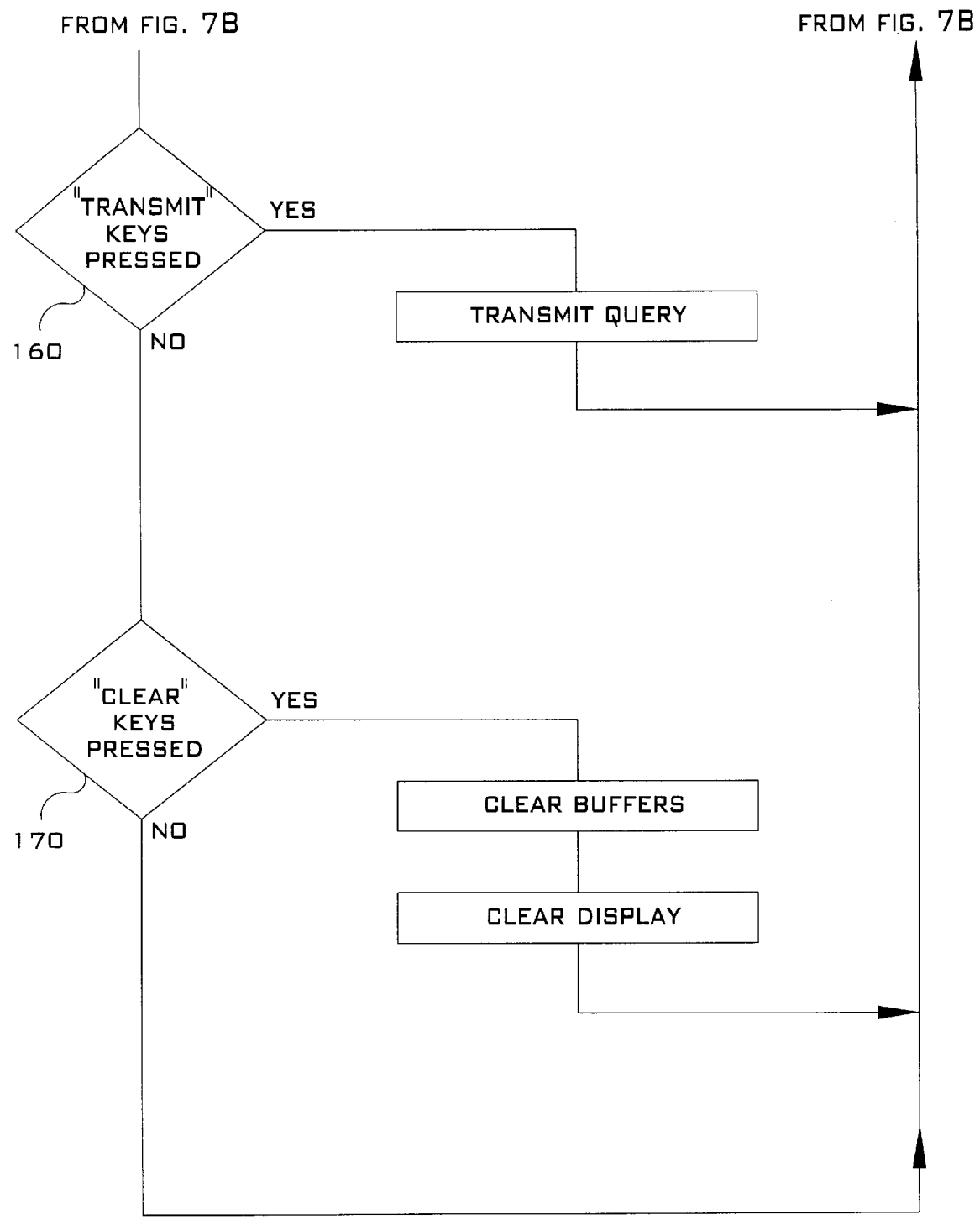

The portable units 20 and the fixed mount units 60 are programmed with software to carry out the shoe size scanner system, preferably in ROM 54 and 76, although the software may be in RAM 42 and 78. As the software routines for the portable 20 and fixed mount 60 remote units are similar, their operation will be explained with reference to the flow chart in FIGS. 7A, 7B and 7C.

On power being applied to the unit, the main routine enters an input loop and checks for various forms of input. If bar code label 16 is scanned, the main routine detects scanner input 110. After processing by the waveshaper circuitry 38 or 72, a copy of the scanner input is stored in the input data buffer 44 or 80. The waveshaper data is assembled in the transfer buffer 50 or 86 into a packet preceded by a unique identifier number which identifies the remote unit, and the packet is automatically transmitted to the base unit 18, either by the RF transmitter/receiver 52 in the case of the portable unit 20, or by hardwire in the case of the fixed mount unit 60. The program then returns to the input mode. If retransmission of the data is requested by the base unit. 18, the data may be reassembled from the input data buffer 44 or 80.

If data is received from the base unit 18, the main routine detects received data 120. Preferably, each transmission from the base unit 18 includes the product identification number, if available, which is stored in the receive data buffer 48 or 84 if the buffer is empty, or is compared to a product identification number already in the buffer 48 or 84 to verify that the transmission is in response to a function query initiated by the remote unit. The product identification number is followed by display data, which may be product description, sizes, prices, etc. A copy of the display data is stored in the display buffer 46 or 82 for scrolling, if necessary, and is displayed on the unit display 56 or 88. The main routine then returns to the input mode.

If the main routine detects that the function key "A" has been pressed 130, signifying a request for a list of all sizes in stock for a particular shoe on display, then a query is assembled in the transfer buffer 50 or 86. The query may consist of the remote unit identification number, the product identification number, and an alphanumeric code signifying a function "A" request. Since no other information needs to be keyed in, the query is transmitted automatically and the main routine returns to the input mode.

If the main routine detects that the function key "B" has been pressed 140, signifying a request for information of the in stock availability of a shoe on display in a particular size and length, the remote unit 20 or 60 displays a prompt for the shoe length. If the sales clerk or customer enters a valid shoe length using the alphanumeric keys 58A or 90A, the remote unit displays a prompt for the shoe width, otherwise the prompt for the shoe length is redisplayed. If the sales clerk or customer enters a valid shoe width, the query is assembled in the transfer buffer 50 or 86, including a remote unit identification number, the product identification number, an alphanumeric code signifying a function "B" request, the shoe length and the shoe width. The main routine then returns to the input mode.

If the main routine detects that the function key "C" has been pressed 150, signifying a request for a list of all shoes of a model on display of any width in stock for a particular length, the remote unit 20 or 60 displays a prompt for the shoe length. If the sales clerk or customer enters a valid shoe length using the alphanumeric keys 58A or 90A, the query is assembled in the transfer buffer 50 or 86, including a remote unit identification number, the product identification number, an alphanumeric code signifying a function "C" request, and the shoe length, otherwise the prompt for the shoe length is redisplayed. The main routine then returns to the input mode.

If the main routine detects that the "transmit" key 58D or 90D has been pressed 160, any query in the transfer buffer 50 or 86 is transmitted to the base unit 18. It will be obvious that the software may contain a prompt asking the user to press the transmit key 58D or 90D when processing a function "B" or "C" request after the query has been assembled.

If the main routine detects that the "clear" key 58E or 90E has been pressed 170, the buffers 44, 46, 48, 50 or 80, 82, 84, 88 are cleared, the display is cleared, and the main routine returns to the input mode.

Figure 8A:
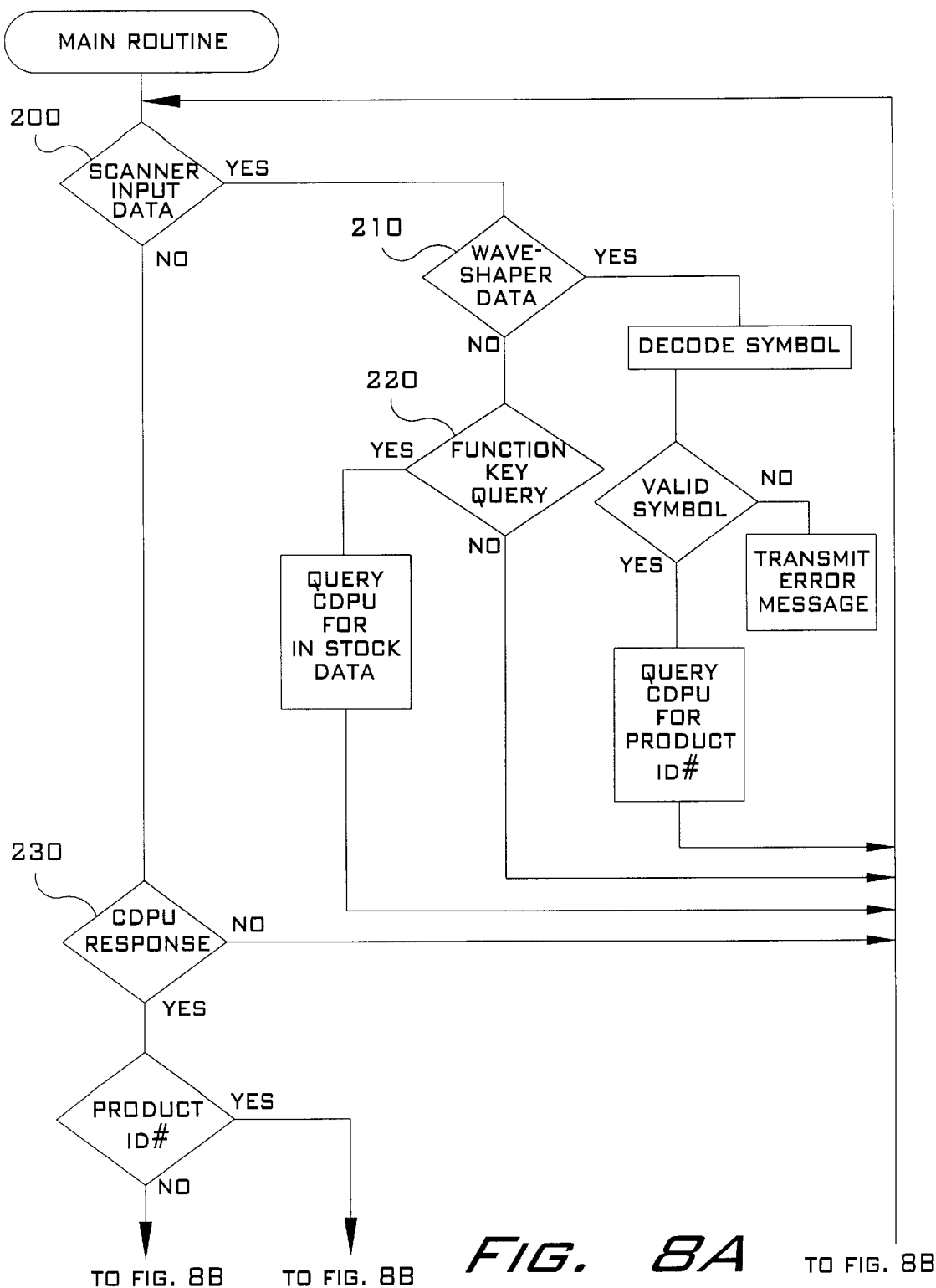
FIGS. 8A and 8B are a flow chart of the software system incorporated into the base unit of the shoe size scanner system according to the present invention.
Figure 8B:
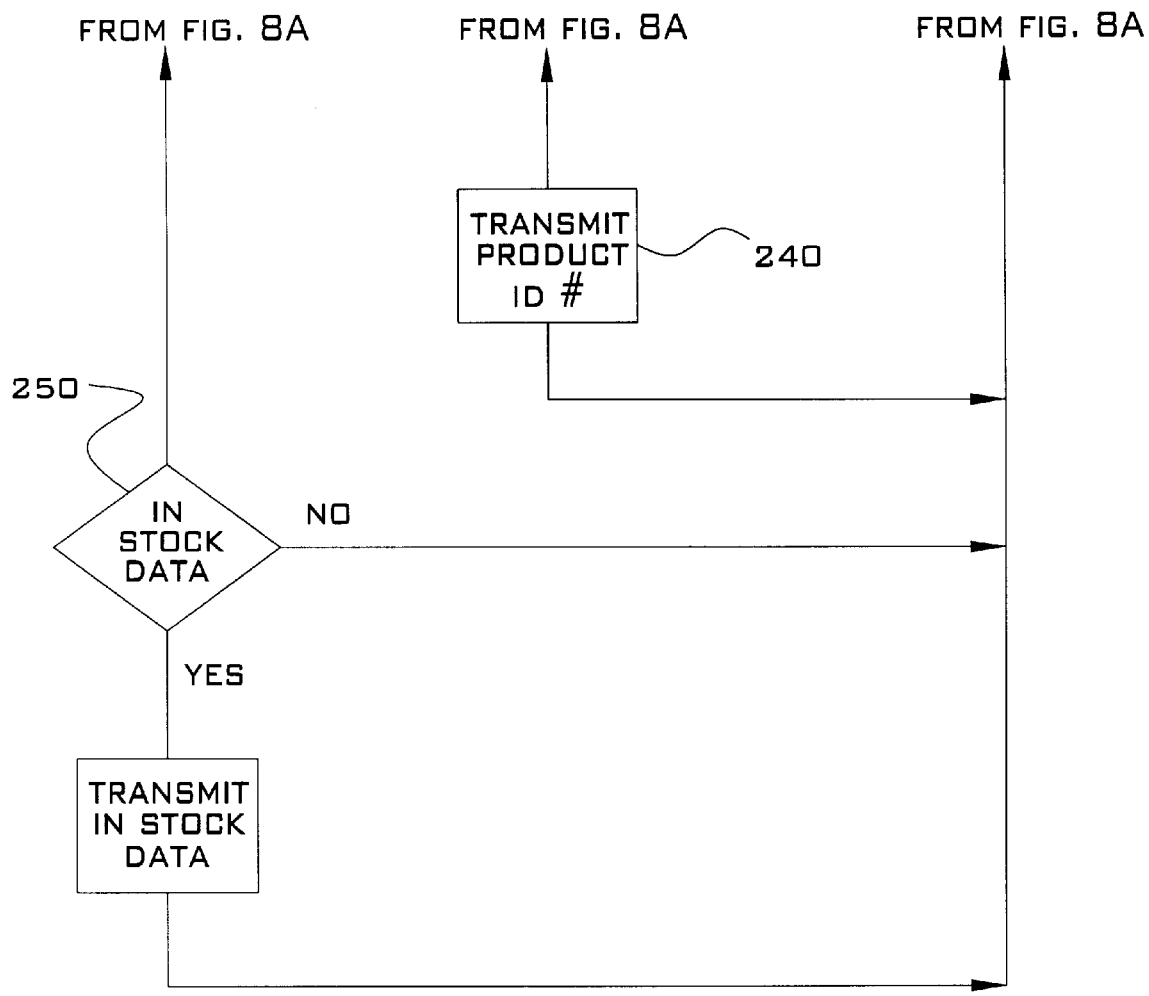

The base unit 18 is programmed with software to respond to communications from the remote units 20, 60 and the CDPU 10. The software may be programmed into ROM 96 or RAM 98 of the decoder 92, or it may be programmed into RAM of the intermediate computer 106 if one is present in the system. Operation of the software will be explained with reference to the flow chart in FIGS. 8A and 8B.

On power being applied to the unit, the main routine enters an input loop, checking for input from either the remote units 20, 60 or the CDPU 10. If a communication is received from the remote units, the scanner input data 200 is checked to determine whether the information is the output from the waveshaper circuitry 38 or 72. If so, then the waveshaper data 210 is decoded and tested to see if the data represents a valid bar code symbol. If a valid bar code symbol is not detected, then an error message is transmitted to the remote unit 20 or 60 and the base unit 18 continues checking for input data. If a valid bar code symbol is detected, then the software prepares and transmits a query, preferably in SQL, to obtain the product description from the CDPU 10, storing the requesting unit's identification number pending a responses from the CDPU 10, and the base unit 18 continues checking for input data. If the communication from the remote unit 20 or 60 represents a function key query 220, then the base unit 18 prepares and transmits a query in SQL to the CDPU 10 to obtain the requested information from the inventory database 12, storing the requesting unit's identification number pending a response from the CDPU, and then continues checking for input data.

If the base unit 18 software detects a CDPU response 230, then the base unit 18 software either transmits the product identification number 240 to the appropriate remote unit 20 or 60 and continues checking for input, or transmits the response to a function query regarding the in stock data 250 to the appropriate remote unit 20 or 60 and continues checking for input data.

In use, a sales clerk may scan the bar code label 16 affixed to a shoe on display using a portable unit 20, or either a customer or a sales clerk may scan a bar code label 16 on a fixed mount unit 60. The bar code data is transmitted instantaneously, either by radio frequency transmitter 52 or by a hardwire connection, to the base unit 18, which decodes the bar code data and queries the inventory database 12 maintained by the CDPU 10 for a product description, or prompts the user with an error code message to rescan the item. The CDPU 10 returns the product description to the base unit 18, which transmits the product description to the remote unit, where it may be viewed on the display 56 or 88. The sales clerk, or the customer, may then request either (1) a list of all shoe sizes in stock for that product; (2) a response indicating whether the shoe is in stock in a specified length and width; or (3) a list of all shoe widths in stock in a specified length. The base unit 18 presents the query to the CDPU 10 in the proper format, and returns the CDPU 10 response for viewing on the display 56 or 88. Price information for each shoe listed in the response is provided.

It will be seen that the present invention produces a tangible result, viz., the visual display on the remote unit's display 56 or 88 of real time information on the in stock availability of a shoe on display in various sizes. Hence, the automated shoe size scanner system saves employee time which would otherwise be spent in performing a manual search of the storeroom, and enhances customer convenience by providing a means to obtain information on the in stock availability of a shoe without the intervention of a ales clerk.

It will be obvious that various improvements or extensions of the shoe size scanner system may be made. The system may be expanded to supply information regarding the availability of the shoe in particular colors by including an additional field in the inventory database 12 for shoe color, which may be returned with the product description or shoe size information. The system may also be expanded to provide information on the location of the shoes in the stock room. This may be done, viz., by identify the storage location in the stockroom by aisle number, row number, and in large establishments, by bin number. The storage location may be included in additional fields on the inventory database 12, and the information may be included with responses to function queries.

The functionality of the system may also be expanded by including the optional computer and printer 100 with the fixed mount scanning unit 60. The computer 100 may be programmed with software which permits a report 300 to be prepared for a particular customer, as shown in FIG. 9. The customer may enter his name 305 for purposes of identifying the report 300. He may then scan a first shoe display model on the fixed mount unit 60 and request a function "A" report by pressing the function "A" key 89A, a second display model requesting a function "B" report by pressing the function "B" key 89B, and a third display model requesting a function "C" report by pressing the function "C" key 89C. The information may then be displayed on the computer monitor and printed, if desired. The report would include, for example, the requested function "A" listing 310, the requested function "B" listing 315, and the requested function "C" listing 320. The customer then has a comparative report available on which he or she may base his or her shopping decision.

A shoe size scanner system method for obtaining in stock status information for a shoe on display may comprise the following steps: (1) labelling a shoe on display with a bar code label having a symbol encoding a product identification number; (2) providing at least one remote bar code scanning unit; (3) scanning said bar code label on the remote scanning unit; (4) decoding said bar code symbol to obtain a decoded product identification number; (5) automatically obtaining a product description of said shoe from an inventory database maintained on a central data processing unit; (6) displaying the product description on the remote scanning unit; (7) selecting a function on the remote unit which requests real time information about the in stock availability of the shoe identified by said scanned label; (8) assembling a query using said decoded product identification number and said selected function; (9) communicating said query to the central data processing unit; (10) communicating a response to said query from the central data processing unit to the remote scanning unit; and (11) displaying said response on said remote unit. It will be understood that although the method has been described with the base unit returning a product identification immediately after the shoe has been scanned and before a function key has been selected, it will be obvious that the system may be designed so that the Central Data Processing Unit does not return the product description until after a function key is pressed, when it is returned with the results of the function query. This modification might be desirable in computer systems in which the inventory database is chronically slow in responding to data requests, in order to avoid customer frustation in waiting for two responses from the CDPU.

It will be understood that although the shoe size scanner system has been described in connection with an inventory maintained on a commercially available relational database, it will be understood that the scope of the claimed invention is not limited to such relational database, but extends to any standard or customized computerized inventory system capable of storing and retrieving shoe size information using a product identification number. It will also be understood that although the system has been described as framing queries to the inventory database in SQL, the system as claimed extends to any programmable method or language for framing queries to a computerized inventory system to retrieve inventory information. It will also be understood that the ROM routines described for operation of the remote units 20, 60 and the base unit 18 are exemplary for purposes of providing an enabling description only, and not for purposes of limitation, the claimed invention extending to any other conventional technique known in the art for communication between the remote units 20, 60, the base unit 18, and the CDPU 10.

It is to be understood that the present invention is not limited to the embodiments described above, but encompasses any and all embodiments within the scope of the following claims.

I claim:

1. A shoe size scanner system for obtaining in stock shoe size information from a computerized inventory database maintained on a central data processing unit, the system comprising:

a) at least one portable remote bar code scanner unit having an input device capable of scanning a bar code symbol and having a radio frequency transceiver;

b) at least one fixed mount remote bar code scanner unit having an input device capable of scanning a bar code symbol;

c) a base unit having a bar code scanner decoder and having a radio frequency transceiver for sending and receiving communication to and from said portable remote bar code scanner unit, the base unit having data communication with the central data processing unit;

d) a data communication means for providing data communication between said fixed mount remote bar code scanner unit and said base unit; and e) product query means for entering a request for in stock information for a scanned display shoe into said remote scanner units and displaying a response containing in stock information obtained from the central data processing unit on said remote scanner units, said product query means comprising:

(i) a keypad on each remote scanner unit, including:
      A) a plurality of function keys; and
      B) a plurality of alphanumeric keys for inputting a particular shoe length and width;

(ii) a display on each remote scanner unit for displaying in stock information received from the central data processing unit; and (iii) means for translating a function requested by one of said function keys into a query to the inventory database for in stock information.

2. The shoe size scanner system according to claim 1, wherein said data communication means comprises a radio frequency transceiver connected to said fixed mount remote bar code scanner unit capable of communicating with the radio frequency transceiver of said base unit.

3. The shoe size scanner system according to claim 1, wherein said data communication means comprises a data communications cable connected between said fixed mount remote bar code scanner unit and said base unit.

4. The shoe size scanner system according to claim 1, wherein said plurality of function keys further comprises:

a) a first function key for requesting all sizes of a scanned display shoe currently in stock;

b) a second function key for requesting whether a scanned display shoe is in stock in a shoe length and width keyed into the keypad;

c) a third function key for requesting all widths of a scanned shoe currently in stock in a length keyed into said keypad.

5. The shoe size scanner system according to claim 1, wherein said portable remote scanner unit comprises a fixed beam bar code scanner.

6. The shoe size scanner system according to claim 1, wherein said portable remote scanner unit further comprises means for transporting said portable remote scanner unit about the person of a user.

7. The shoe size scanner system according to claim 6, wherein said means for transporting comprises a strap attached to said unit adapted for wearing about the user's neck.

8. The shoe size scanner system according to claim 6, wherein said means for transporting comprises an arm band attached to said unit for wearing on an arm of the user.

9. The shoe size scanner system according to claim 6, wherein said means for transporting comprises a belt clip attached to said unit for attachment to a belt worn by a user.

10. The shoe size scanner system according to claim 1, wherein said fixed mount remote scanner unit comprises a moving beam bar code scanner.

11. The shoe size scanner system according to claim 1, wherein said base unit further comprises a personal computer and a printer connected to said fixed mount unit for printing a report summarizing in stock information requested for a scanned shoe.

12. The shoe size scanner system according to claim 1, wherein said base unit further comprises software mounted in said decoder for translating a product query from one of said remote scanner units into a structured query language request for information from the inventory database, the request including a product identification number scanned from a bar code label affixed to a shoe on display.

13. A shoe size scanner system method for obtaining in stock status information for a shoe on display, comprising the steps of:

(a) labelling a shoe on display with a bar code label having a symbol encoding a product identification number;

(b) providing at least one remote bar code scanner unit;

(c) scanning said bar code label on the remote scanner unit;

(d) decoding said bar code symbol to obtain a decoded product identification number;

(e) automatically obtaining a product description of said shoe from an inventory database maintained on a central data processing unit;

(f) displaying the product description on the remote scanner unit;

(g) selecting a function on the remote scanner unit which requests real time information about the in stock availability of the shoe identified by said scanned label, including:

(i) requesting whether a scanned display shoe is in stock in a particular shoe length and width; and (ii) entering the particular shoe length and shoe width into the remote scanner unit;

(h) assembling a query using said decoded product identification number and said selected function;

(i) communicating said query to the central data processing unit;

(j) communicating a response to said query from the central data processing unit to the remote scanner unit; and (k) displaying said response on said remote scanner unit.

14. The shoe size scanner system method according to claim 13, wherein the step of providing at least one remote bar code scanner unit further comprises the step of providing at least one battery powered portable bar code scanner unit for use by a sales clerk.

15. The shoe size scanner system method according to claim 13, wherein the step of providing at least one remote bar code scanner unit further comprises the step of providing at least one fixed mount bar code scanner unit and the step of locating said fixed mount scanner unit adjacent a shoe display for use by a customer.

16. The shoe size scanner system method according to claim 13, wherein the step of selecting a function on the remote scanner unit further comprises the step of selecting a function requesting all sizes of a scanned display shoe currently in stock.

17. The shoe size scanner system method according to claim 13, further comprising the steps of:

(a) providing a printer adjacent said at least one remote bar code scanner unit;

(b) repeating steps (a) through (j) for a plurality of different shoe models on display; and (c) printing a report summarizing each response from the central data processing unit for comparison by a customer.

18. A shoe size scanner system method for obtaining in stock status information for a shoe on display, comprising the steps of:

(a) labelling a shoe on display with a bar code label having a symbol encoding a product identification number;

(b) providing at least one remote bar code scanner unit;

(c) scanning said bar code label on the remote scanner unit;

(d) decoding said bar code symbol to obtain a decoded product identification number;

(e) automatically obtaining a product description of said shoe from an inventory database maintained on a central data processing unit;

(f) displaying the product description on the remote scanner unit;

(g) selecting a function on the remote scanner unit which requests real time information about the in stock availability of the shoe identified by said scanned label, including:

(i) requesting all widths of a scanned shoe currently in stock in a specified length; and (ii) entering the particular shoe length into the remote scanner unit;

(h) assembling a query using said decoded product identification number and said selected function;

(i) communicating said query to the central data processing unit;

(j) communicating a response to said query from the central data processing unit to the remote scanner unit; and (k) displaying said response on said remote scanner unit.

* * * * *